United States Patent [19]
Izumi

[11] 3,839,160
[45] Oct. 1, 1974

[54] MULTIPLE EFFECT EVAPORATOR

[75] Inventor: Kenkichi Izumi, Ibaraki, Japan

[73] Assignee: Hitachi, Ltd., Tokyo, Japan

[22] Filed: June 18, 1973

[21] Appl. No.: 371,015

[30] Foreign Application Priority Data
June 23, 1972 Japan.............................. 47-62382
Oct. 30, 1972 Japan........................ 47-107970

[52] U.S. Cl................ 202/173, 202/174, 203/11, 159/17 VS, 159/2 MS, 159/DIG. 8, 159/DIG. 22

[51] Int. Cl......... B01d 3/02, B01d 1/26, B01d 3/00, B01d 1/28, B01d 3/10

[58] Field of Search........ 159/2 MS, 17 VS, DIG. 8, 159/DIG. 22; 202/173, 174; 203/11

[56] References Cited
UNITED STATES PATENTS

| | | | |
|---|---|---|---|
| 3,155,600 | 11/1964 | Williamson | 203/11 |
| 3,322,648 | 5/1967 | Kays et al. | 202/174 |
| 3,351,120 | 11/1967 | Goeldner et al. | 159/13 B |
| 3,428,107 | 2/1969 | Backteman | 159/47 WL |
| 3,532,152 | 10/1970 | Cartinhour | 159/20 R |
| 3,672,960 | 6/1972 | Kays | 203/11 |
| 3,697,383 | 10/1972 | Weaver | 159/DIG. 8 X |

FOREIGN PATENTS OR APPLICATIONS

| | | | |
|---|---|---|---|
| 1,196,140 | 7/1965 | Germany | 159/44 |

*Primary Examiner*—Jack Sofer
*Attorney, Agent, or Firm*—Elliott I. Pollock

[57] ABSTRACT

A multiple effect evaporator for making fresh water from sea water, comprising a multistage flash evaporator serving the purpose of sea water preheating, in which said multistage flash evaporator is combined with a multistage fresh water flash evaporator so that pure water can also be made, and the evaporation-condensation area is distributed according to the amount of vapour generated at each evaporation stage to enhance the thermal efficiency and further the evaporator effects and multistage flash evaporator are arranged in a single casing to eliminate a certain piping and thereby to simplify the construction of the evaporator.

5 Claims, 11 Drawing Figures

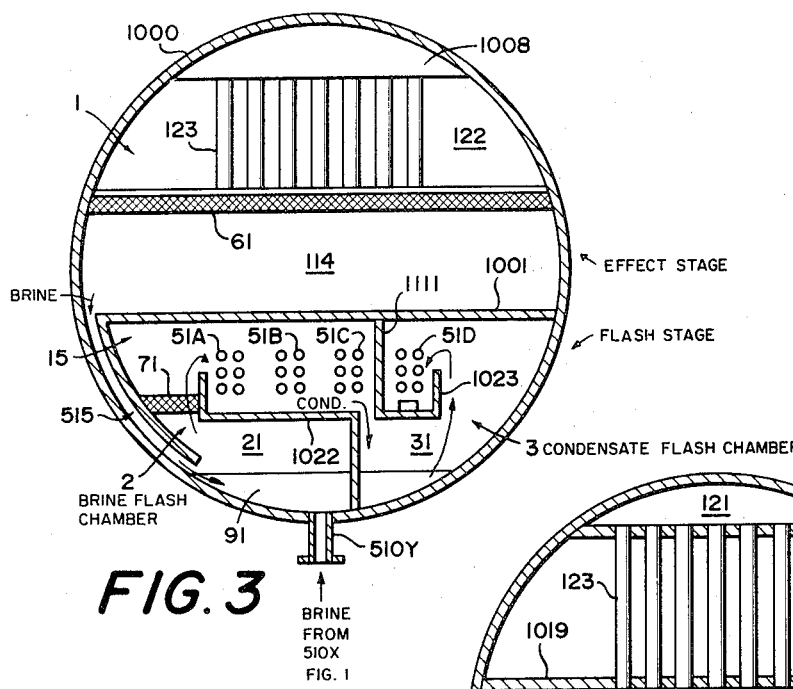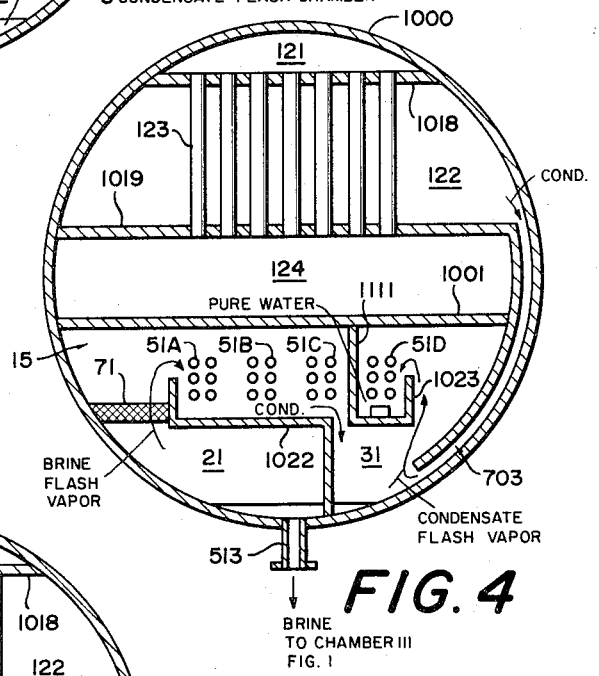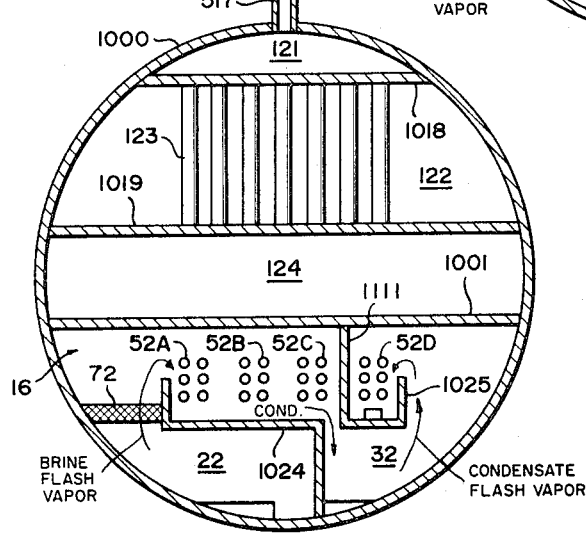

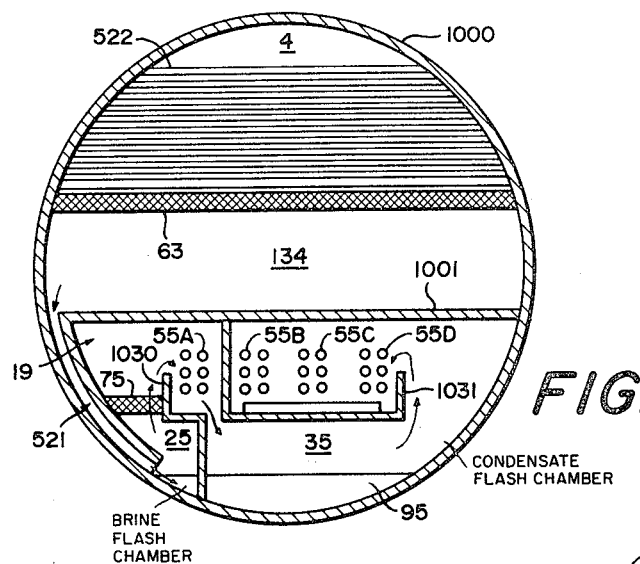
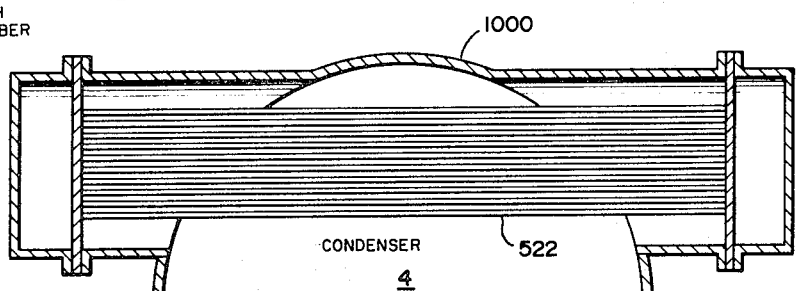
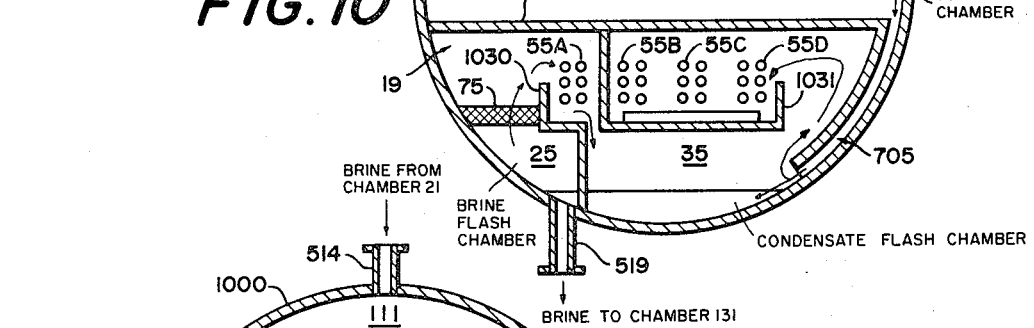
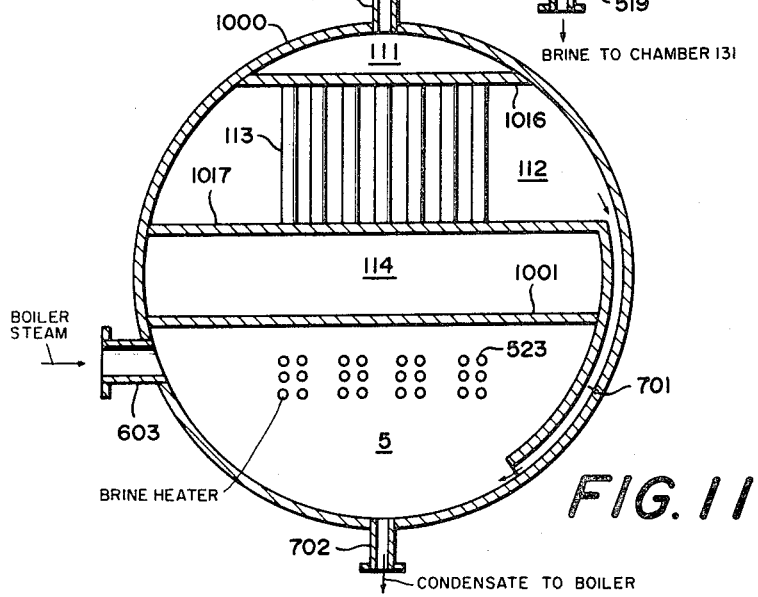
FIG. 9
FIG. 10
FIG. 11

MULTIPLE EFFECT EVAPORATOR

This invention relates to a multiple effect evaporator having a multistage flash evaporator and adapted for making fresh water from sea water, and more particularly to a single casing multiple effect evaporator.

Multiple effect evaporators generally have several evaporator effects which are arranged serially according to the operating temperature. A feed liquor, e.g. feed sea water, passing in the evaporator effects is heated by heating means. The feed liquor is passed from a first evaporator effect heated at a high temperature sequentially to the successive evaporator effects maintained at progressively lowered temperatures and the vapour generated at a preceding higher temperature evaporator effect is used as a heating source for the following evaporator effect and cooled per. se. The multiple effect evaporators usually have vertical tube-type heat exchanging means, and the feed liquor flows down in the tubes in the form of a film and is heated during the flow-down by the heated vapour exterior of the tube. The feed liquor is partially evaporated in this case and led into a vapour-liquor separating chamber together with the vapour thus generated. The hot vapour is condensed and collected as fresh water. The liquor having an increased concentration as a result of the above-described process (hereinafter referred to as "brine") is introduced into the following evaporator effect, wherein it is partially evaporated and further increased in concentration.

It is known that the multiple effect evaporation process has the feature that the brine concentration is lower at higher temperature stages and becomes progressively higher at the lower temperature stages, as described above, and is highly effective for the prevention of the deposition of scales on the inner wall of the brine conduit, in a process of making fresh water from sea water. A multiple effect evaporator has been known in which a multistage flash evaporator is used as means for preheating the liquor supplied to the highest temperature evaporator effect, for improving the thermal efficiency.

This prior art multiple effect evaporator comprising the multistage flash preheater is capable of producing about 50 PPM of fresh water but not capable of making pure water. Therefore, it is impossible to supply the fresh water produced in the evaporator directly to a once-through boiler or the like which calls for about 0.05 PPM of pure water, and the fresh water must be subjected to the process of purification usually applied to the boiler feedwater before it is supplied to the boiler, because otherwise the deposition of scales on the inner wall of the tube and the corrosion of the tube would result.

Apparatuses for producing fresh water from sea water are in the trend of becoming larger and larger in size, and the materialization of an apparatus capable of producing 10 to 20 tons of fresh water per day is being desired. Such an apparatus is required to be capable of processing as large an amount of feed liquor as possible with a minimum pressure loss. It is desirable to design the apparatus such that it is operable with a minimum amount of scale formed at the high temperature part while maintaining the thermal efficiency at a high level, and is capable of processing as large an amount of feed liquor as possible without increasing the dimension of the casing, so as to produce a large amount of fresh water.

An object of the present invention is to provide an apparatus which is singly capable of producing pure water from fresh water by making use of the latent heat possessed by the fresh water, while maintaining the high thermal efficiency of the multiple effect evaporator comprising a multistage flash preheater.

Another object of the invention is to provide an apparatus of the character described above, in which the condensation area is distributed according to the amount of vapour generated at the respective evaporation stages by the flash evaporation of a feed liquor and fresh water, whereby the heat can be collected highly efficiently.

Still another object of the invention is to provide an apparatus of the character described above, in which several evaporation effects and multistage flash evaporator means are arranged in a single casing in a manner not to diminish the performances thereof, whereby a certain piping can be eliminated.

Still another object of the invention is to provide an apparatus of the character described, in which means for producing pure water from fresh water is arranged in a single casing to reduce or restrict a certain piping.

A further object of the invention is to provide an apparatus of the character described above, in which means for producing pure water from fresh water is provided in adjoining relation with multistage flash evaporator means.

The relation between the amount of brine and the amount of fresh water formed, in a multistage flash evaporator, is as follows: Namely, in the event when the concentration ratio is four times, while the sum of the aforesaid amounts is the same in each evaporation stage, the amount of brine is large and the amount of fresh water formed is very slight in the relatively high temperature stages, but the proportion of the fresh water to the brine increases toward the lower temperature evaporation stages and is 3 : 1 at the final stage. Therefore, it will be understood that, in the production of fresh water from the brine and pure water from the fresh water, it is desirable to distribute the condensation areas of the respective stages in proportion to the amounts of vapour generated from the feed liquor or, in other words, to the flow rate of the feed liquor in the respective stages.

The multistage flash evaporator generally comprises several evaporation stages arranged serially, several condensation stages for condensing the vapour generated in said respective evaporation stages into fresh water by heat exchange between the feed liquor and said vapour, and means for heating the feed liquor emerging from said condensation stages, the temperature and pressure of said evaporation stages being progressively reduced from one to the other end of the serial arrangement. In the present invention, the number of evaporation stages of the multistage flash evaporator is selected suitably according to the efficiency of each evaporation effect of the multiple effect evaporator, for example two to three evaporation stages are provided for each evaporation effect of the multiple effect evaporator. The feed liquor is first preheated in the flash evaporator and then supplied to the first evaporator effect in the form of brine, wherein it is further heated by other hot vapour, and thereafter evaporated partially. The preheated liquor may be introduced into the first evaporator effect, either directly or after having been passed in the evaporation stage once again.

The present invention proposes a multiple effect evaporator comprising a multistage fresh water flash evaporator having several evaporation stages for evaporating fresh water arranged serially, several condensation stages for condensing the vapour generated in said respective evaporation stages to pure water and means for withdrawing the pure water from said respective condensation stages independently of the fresh water, said evaporation stages being arranged such that the temperature and pressure progressively become lower from one to the other end of the arrangement; lines for leading the concentrated residual liquor from the evaporation effects into the corresponding evaporation stages of the flash evaporator for partial evaporation therein and supplying the residual liquor to the next stage evaporation effects in the concentrated state; and lines for leading the hot fresh water formed in said flash evaporator and/or evaporation effects into the evaporation stages of the multistage flash evaporator wherein the fresh water is again evaporated by flash evaporation by the latent heat possessed thereby and the vapour thus generated is condensed to pure water which is withdrawn from said evaporation stages independently of the fresh water to be used as industrial water for special purposes, e.g. as feedwater of boilers.

The fresh water is formed at the condensation stages of the multiple effect evaporator and the multistage flash evaporator. The fresh water from both of the evaporators or from one of them is introduced into the evaporation stages of the multistage fresh water flash evaporator, wherein it is flashed and condensed to pure water. The pure water thus formed is withdrawn independently of the residual fresh water or the fresh water not introduced into the evaporation stages, and therefore, can be used as highly pure industrial water.

The feed sea water may be introduced into the evaporator effect of the multiple effect evaporator immediately after it is heated, or may alternatively be introduced into the brine recycling path without being introduced into said evaporation effect. In the brine recycling path, the heated feed sea water is introduced into the evaporation stages of the multistage flash evaporator and the brine in said evaporation stage is introduced into the aforesaid evaporator effect. The brine in this evaporation stage is led into the aforesaid evaporator effect and the residual brine in said evaporator effect is again returned to the evaporation stage of the multistage flash evaporator. Such a brine recycling path can be formed at the evaporation stage corresponding to each evaporator effect. In the manner described the concentration of the brine can be increased toward the lowest temperature evaporation stage from its low concentration at the highest temperature stage, and therefore, it is possible to increase the water-making efficiency without encountering the scale problem. When it is desired to increase the amount of pure water formed, this may simply be achieved by forming the aforesaid recycling path by fresh water. Namely, in this case the fresh water formed in the multistage fresh water flash evaporator is introduced into the evaporator effect of the multiple effect evaporator wherein it is evaporated again, and the resulting vapour is used as the heating source for the next evaporator effect and finally condensed to pure water.

Further, according to the invention the interior of the single casing is divided into an evaporator effect part and a multistage flash evaporation part by a partition wall. The evaporator effect part consists of several evaporator effects, a brine chamber formed adjacent, preferably above, said evaporator effects and a vapour-liquor separating chamber formed adjacent, preferably below, said evaporator effects. The multistage flash evaporation part consists of a heating chamber having a feed liquor feed pipe disposed therein and a feed liquor flash chamber.

The partition wall is utilized as part of the evaporator effect part and multistage flash evaporation part, so as to achieve the effective use of the internal space of the casing. For communicating the evaporator effect part and the multistage flash evaporation part with each other, the casing is provided therein with means, e.g. outlet and inlet ports, for leading the feed liquor into the brine chamber, and means, e.g. outlet and inlet ports for leading the brine from the vapour-liquor separating chamber into the flash chamber.

The evaporator effect part and the multistage flash evaporation part respectively are arranged axially and provided in the single casing in adjoining relation with each other so as thereby to minimize the pressure loss. It is preferable that part of the inner wall of the casing is utilized to form a passage for leading the vapour separated in the vapour-liquor separating chamber into the heating means of the next evaporator effect and a passage for leading the vapour generated in the flash chamber into said heating chamber.

The means for producing pure water by the flash evaporation of the fresh water formed may be arranged in the single casing. In this case, a partition wall is provided in the heating chamber to divide the interior of said chamber into a first chamber in which the vapour generated by the flash evaporation of the feed liquor is to be condensed and a second chamber in which the liquor formed in said first chamber is to be flash-evaporated again and the vapour thus generated is to be condensed. The position of the partition wall is selected preferably such that the area ratio between the first chamber or a multistage flash evaporation part heating chamber and the second chamber or a fresh water flash evaporation part heating chamber can be gradually changed according to the flow rate ratio between the brine and fresh water, so as to achieve efficiently the flash evaporation of the brine or fresh water and the condensation of the vapour.

The arrangement described above enables a large amount of feed liquor to be processed with high efficiency, reduces the size of the casing and therefore reduces the cost of manufacture of the entire apparatus, and facilitates the packaging of the apparatus.

These and other features of the present invention will be fully understood from the following detailed description taken in conjunction with the accompanying drawings.

FIG. 3 is a vertical sectional view taken on the line III—III of FIG. 2;

FIG. 4 is a vertical sectional view taken on the line IV—IV of FIG. 2;

FIG. 5 is a vertical sectional view taken on the line V—V of FIG. 2;

FIG. 9 is a vertical sectional view taken on the line IX—IX of FIG. 2;

FIG. 10 is a vertical sectional view taken on the line X—X of FIG. 2; and

FIG. 11 is a vertical sectional view taken on the line XI—XI of FIG. 2.

Figure 1:
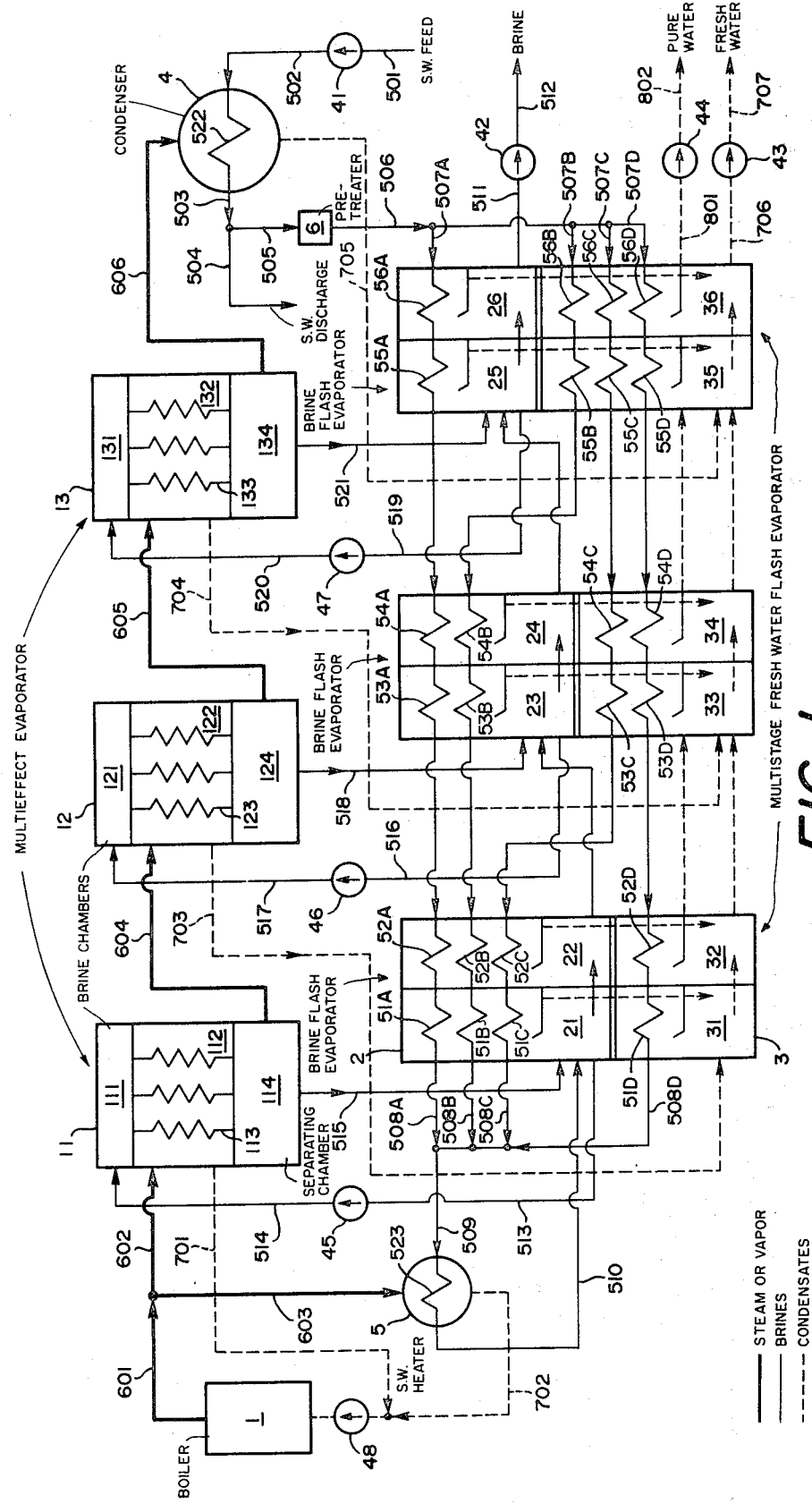
FIG. 1 is a process diagram of a multiple effects evaporator according to the present invention.

In FIG. 1 there is shown a process diagram of a multiple effect evaporator with a multistage flash preheater, embodying the present invention.

The apparatus comprises triple-vertical tube-bank type evaporator units 11, 12, 13; a six-stage flash evaporator 2; a six-stage fresh water flash evaporator 3; a condenser 4; a sea water heater 5; a sea water pretreating unit 6 and pumps. The vertical tube type evaporator units 11, 12, 13 respectively comprise brine chambers 111, 121, 131; hot vapour chambers 112, 122, 132; vertical heating tubes 113, 123, 133; and vapour-liquor separating chambers 114, 124, 134. The multistage flash evaporator comprises sea water evaporation stages 21, 22, . . . 26 and condensation stages. The six-stage fresh water flash evaporator 3 comprises fresh water evaporation stages 31 to 36 and condensation stages. The multistage flash evaporator 2 and multistage fresh water flash evaporator 3 constitute a multistage flash preheater for preheating feed sea water.

Sea water is pumped in a pipe 501 by a sea water pump 41 and led into condenser 4 through a pipe 502. The sea water leaving the condenser 4 passes in a pipe 503, and the major portion thereof is discharged from a pipe 504, while a minor portion thereof is introduced into the sea water pretreating unit 6 through a pipe 505. The sea water pretreating unit 6 is usually comprised of decarbonating means for the prevention of scale formation and degasifying means for the prevention of corrosion. The pretreated sea water from the pretreating unit passes in a pipe 506 and flows divergingly into pipes 507A, 507B, 507C and 507D. The sea water passing in the pipe 507A flows in heating tubes of condensers 56A, 55A, . . . 51A of the multistage flash preheater to condense the vapour generated in said condensers and is concurrently heated, and discharged from a pipe 508A. At the same time, the sea water passing in the pipe 507B flows in condensers 56B, 55B, . . . 51B and is discharged from a pipe 508B. The sea water passing in the pipe 507C flows in condensers 56C, 55C, . . . 51C and is discharged from a pipe 508C. Further, the sea water passing in the pipe 507D flows in condensers 56D, 55D, . . . 51D and is discharged from a pipe 508D. The sea waters emerging from the pipes 508A, 508B, 508C, 508D are joined and introduced into the sea water heater 5 from a pipe 509, in which it is heated and then led into the first stage 21 of the sea water evaporator 2 through a pipe 510 (FIG. 1), in which it is partially flash-evaporated. The brine formed in the stage 21 is led into the stage 22 and flash-evaporated therein. Likewise, the brine is passed successively in stages 23, 24, 25, 26 while being flash-evaporated in said respective stages, withdrawn from a pipe 511 by a brine discharge pump 42 and discharged from a pipe 512.

The brine formed in the evaporation stage 21 of the sea water evaporator 2 is pumped through a pipe 513 by a brine recycling pump 45 and led from a pipe 514 into the brine chamber 111 of the evaporator unit 11. This brine is distributed into a large number of the vertical heating tubes 113 by means of a nozzle disposed in an inlet thereof and heated during passage through said tubes by the external vapour, while partially being evaporated in said tubes. The brine-vapour mixture is discharged from the lower tube ends in the state of two-phase flow into the vapour-liquor separating chamber 114, in which the brine and vapour are separated from each other. The brine emerging from the chamber 114 is returned to the stage 21 of the sea water evaporator 2 through a pipe 515. The same process takes place between the evaporator unit 12 and the evaporation stage 23 of the sea water evaporator 2 and between the evaporator unit 13 and the evaporation stage 25 of the sea water evaporator 2.

The hot vapour is normally supplied from a boiler 1 through a pipe 601, and the major portion thereof is led into the evaporator unit 11 from a pipe 602 and the remaining portion thereof into the sea water heater 5 from a pipe 603. The vapour drain of the evaporator unit 11 is withdrawn from a pipe 701 and the vapour drain of the sea water heater 5 from a pipe 702, both to be returned to the boiler by a boiler condensing pump 48. The vapour generated in the evaporator unit 11 is led into the next stage evaporator unit 12 through a pipe 604 to be used for heating the brine in said unit and the vapour generated in the evaporator unit 12 is led into the next stage evaporator unit 13 through a pipe 605 to be used for heating the brine in said unit. The vapour generated in the evaporator unit 13 is led into the condenser 4 through a pipe 606 and condensed therein to fresh water.

The vapour drain of the evaporator unit 11 is returned to the boiler 1 but the vapour drain (fresh water formed) of the evaporator unit 12 is led into the first stage 31 of the fresh water evaporator 3 through a pipe 703. In the stage 31, the fresh water is partially flash-evaporated and then led into the stage 32 together with the fresh water from the stage 21 of the sea water evaporator 2. The fresh water is again partially flash-evaporated in the stage 32 and then led into the stage 33 together with the fresh water from the stage 22 of the sea water evaporator 2. To the stage 33 of the fresh water evaporator 3 is supplied through a pipe 704 the vapour drain (fresh water formed) from the evaporator unit 13. The fresh waters supplied to the stage 33 of the fresh water evaporator 3 from the two lines are respectively partially flash-evaporated and led into the stage 34 together with the fresh water from the stage 23 of the sea water evaporator 2, wherein they are again partially flash-evaporated and then led into the stage 35 together with the fresh water from the stage 24 of the sea water evaporator 2. To the stage 35 is supplied through a pipe 705 the vapour drain (fresh water) from the condenser 4. The fresh waters supplied to the stage 35 from the two lines are respectively partially flash-evaporated therein and then led into the stage 36 together with the fresh water from the stage 25 of the sea water evaporator 2, wherein they are partially flash-evaporated. The fresh water leading to the stage 36 is joined with the fresh water from the stage 26 of the sea water evaporator 2 and then withdrawn through a pipe 706 by a fresh water pump 43 and discharged from a pipe 707 (FIG. 1) as the product fresh water.

The distilled water obtained in the fresh water evaporator 3 by the flash evaporation of the fresh water is pure water of extremely high purity, which is formed in the evaporation stages 31 to 36, passed successively through the stages 31 to 36 and withdrawn through a pipe 801 by a pure water pump 44 and discharged from a pipe 802 (FIG. 1) as the product pure water. The apparatus is capable of producing fresh water of about 50 PPM and pure water of 0.002 PPM from a feed sea water of 30,000 PPM, the amount ratio of the fresh water to pure water being 8 : 1.

The internal pressures of the evaporator units 11, 12, 13, the stages 21 to 26 of the sea water evaporator 2 and the stages 31 to 36 of the fresh water evaporator 3 are so adjusted by bleeding means (not shown) that they become progressively lowered in the order mentioned.

The features of the present invention lie in that the multistage flash evaporator is divided into two lines, i.e. the sea water evaporator 2 and fresh water evaporator 3, so that fresh water and pure water may be obtained concurrently, in that the fresh water formed in the stages 21 to 26 of the sea water evaporator 2 is led into the corresponding stages 31 to 36 of the fresh water evaporator 3, and in that the numbers of the condensing heating pipes provided in the stage 21 and the corresponding stage 31, in the stage 22 and the corresponding stage 32, . . . , in the stage 26 and the corresponding stage 36 respectively of the sea water evaporator 2 and fresh water evaporator 3 are divided respectively in proportion to the flow rates of the sea water and fresh water passing in said respective stages. Namely, the sea water is diverged into four lines, i.e. the pipes 507A, 507B, 507C, 507D (FIG. 1), and one pipe line is provided in the sea water evaporator 2 and three pipe lines in the fresh water evaporator 3 at the stages 26 and 36 and the stages 25 and 35; two pipe lines are provided in the sea water evaporator 2 and two pipe lines in the fresh water evaporator 3 at the stages 24 and 34 and the stages 23 and 33; and three pipe lines are provided in the sea water evaporator 2 and one pipe line in the fresh water evaporator 3 at the stages 22 and 32 and the stages 21 and 31.

Now, one form of unitary multiple effect evaporator operative according to the process diagram described above will be described with reference to FIGS. 2 to 11.

The apparatus comprises a cylindrical casing 1000, the vertical tube type evaporator effect part 1 (FIG. 3) and the condenser 4 (FIGS. 2, 9 and 10) arranged in the upper portion of said casing, and the multistage flash evaporation part 2 (FIG. 3), the multistage fresh water flash evaporation part 3 (FIG. 3) and the sea water heater 5 (FIGS. 2 and 11) arranged in the lower portion of said casing.

The evaporator effect part 1 is formed of the evaporator effects 11, 12, 13 arranged axially of the casing 1,000, the temperature of said evaporator effects being progressively lowered from one to the other end of said part. The multistage flash evaporation part 2 is formed of the evaporation stages 21, 22, . . . , 26 and the vapor condensing chambers 15, 16, ..., 20. The multistage fresh water flash evaporation part 3 is made up of the fresh water evaporation stages 31, 32, . . . , 36 and the vapor condensing chambers 15, 16, . . . , 20. The evaporation stages 21 . . . 26 and the vapor condensing chambers 15 . . . 20 respectively are arranged axially of the casing 1,000 such that the temperature thereof becomes progressively lowered from one to the other end of said casing.

Figure 2:
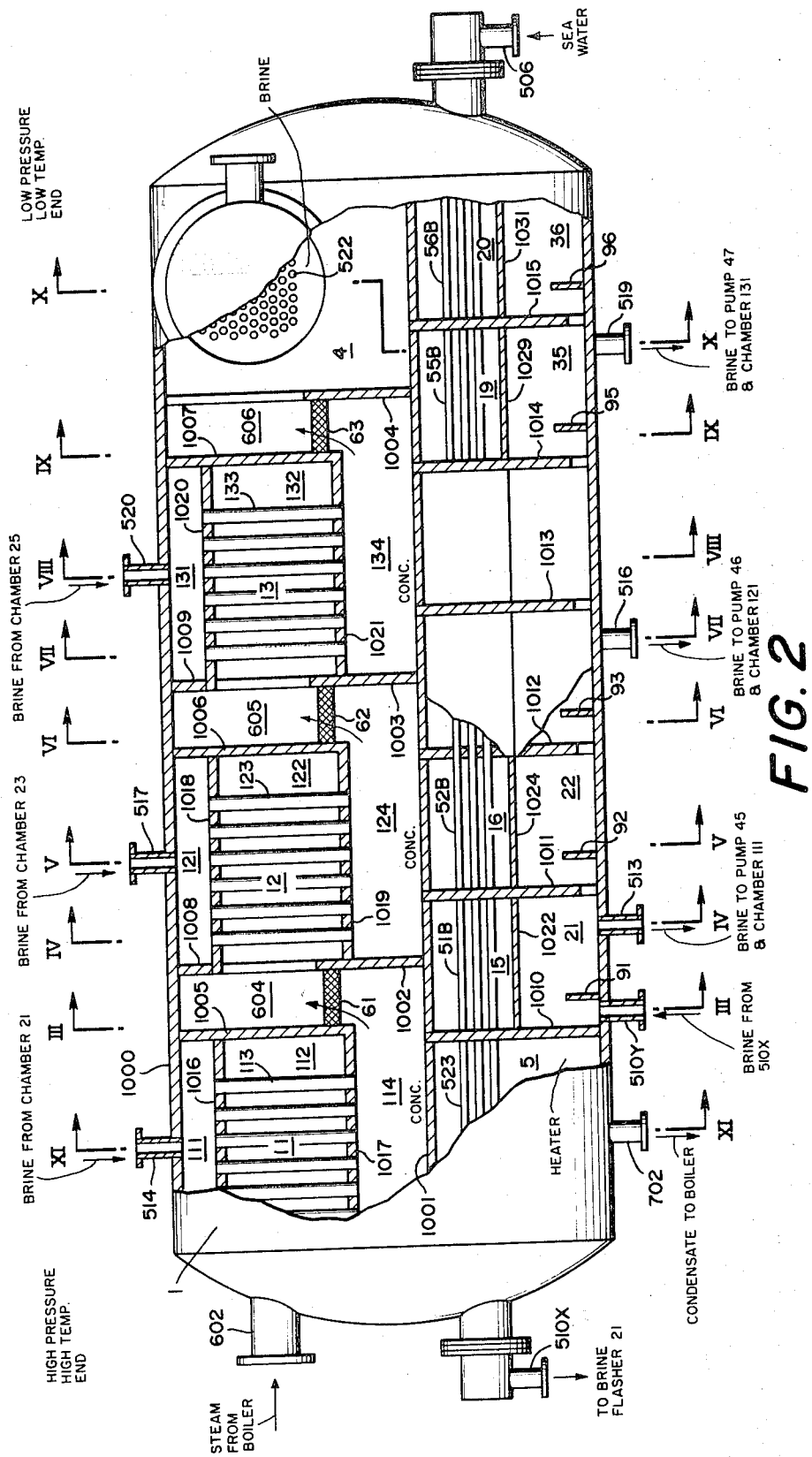
FIG. 2 is a sectional view showing the unitary multiple effect evaporator unit according to the invention.

As shown in FIG. 2, the vertical tube type evaporator effects 11, 12, 13 respectively are made up of the brine chambers 111, 121, 131, brine inlet pipes 514, 517, 520, the heating chambers 112, 122, 132, the vertical heating tubes 113, 123, 133, upper tube plates 1016, 1018, 1020, lower tube plates 1017, 1019, 1021 and the vapour-liquor separating chambers 114, 124, 134. Each of the vertical tube evaporator effects 11, 12, 13 is formed in the casing 1,000 by a horizontal partition plate 1,001 and a vertical partition plate 1,002. Vapour passages 604 to 606 are formed between the respective evaporator effects 11 to 13 and the condenser 4, and demistors 61 to 63 are provided in the respective vapour passages. The evaporation stages 21, 22, . . ., 26 , the fresh water evaporation stages 31, 32, . . . , 36, and the vapor condensing chambers 15, 16, . . . , 20, are formed between the casing 1000 and the horizontal partition plate 1,001, and are separated from each other axially of the casing by partition plates 1,010, 1,011, . . . , 1015 each having tube passage holes formed therein, and further the interior of each of them is divided vertically of the casing by horizontal partition plate 1,022, 1,023, . . . or 1,033. The evaporation stages 21 to 26 and fresh water evaporation stages 31 to 36 respectively are provided therein with weir plates 91 to 96, and further the evaporation stages 21 to 26 respectively are provided therein with demistors 71 to 76 (FIG. 3).

The condensing chambers 15 to 20 each have provided therein a number of conduits for passing feed liquor therein, which serve to heat the feed liqour and condense the vapour resulting from flash evaporation as will be described later. Each of the condensing chambers 15 to 20 is divided into two sub-chambers by a partition wall 1111 (FIG. 3) provided therein, and one of said sub-chambers lies in the multistage flash evaporation part 2 and another one in the multistage fresh water flash evaporation part 3.

The multistage flash evaporation part 2 and multistage fresh water flash evaporation part 3 constitute a preheater for preheating feed sea water.

The areas of the evaporation chambers and the numbers of the condensing heating tubes provided in said chambers, at each stage of the multistage flash evaporation part and fresh water evaporation part, are allocated according to the flow rates of the sea water and fresh water passing in said chambers, and the fresh water formed in the sea water evaporation stage is led into the fresh water evaporation stage and the vapour generated in said fresh water evaporation stage is taken out as pure water. An arrangement is also made such that the brine and fresh water formed in the evaporator unit are introduced into the flash evaporation part through passages formed in said unit.

In the embodiment shown, the vapour-liquor separating chambers 114, 124, 134 are arranged below the evaporation effects 11, 12, 13 and further the condensing chambers 15 to 20 each having the feed liquor conduits therein are arranged below said separating chambers. The vapour-liquor separating chambers and the condensing chambers are separated from each other by the partition plate 1,001. The partition plate 1,001 extends axially of the casing 1,000, forming parts of the vapour-liquor separating chambers and condensing chambers, and separating the evaporator effect part 1 and multistage flash evaporation part 2 from each other.

Figure 6:
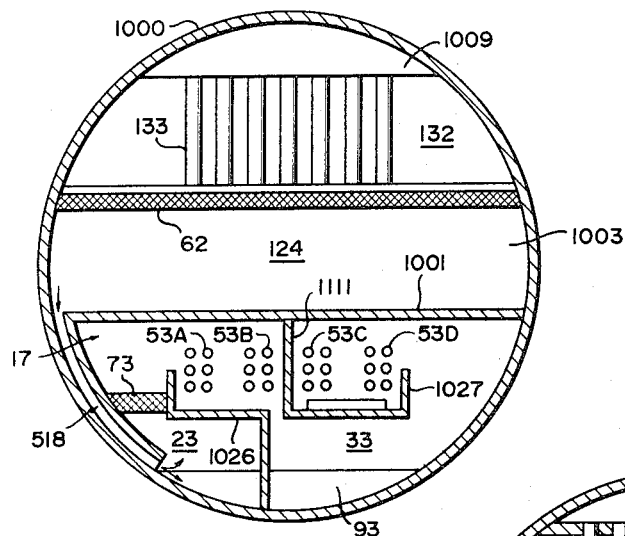
FIG. 6 is a vertical sectional view taken on the line VI—VI of FIG. 2.
Figure 7:
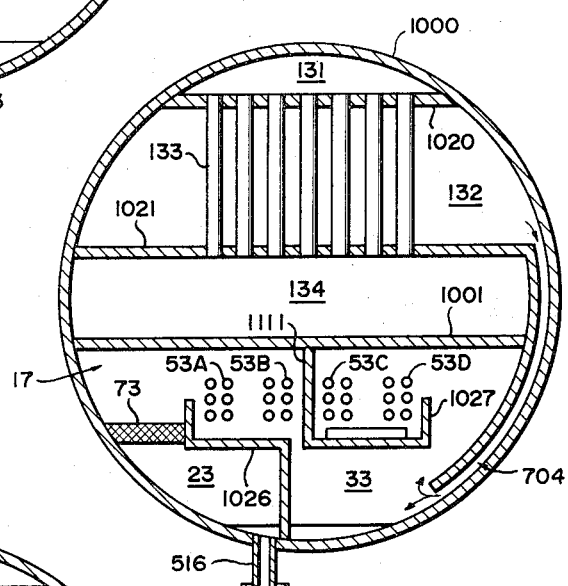
FIG. 7 is a vertical sectional view taken on the line VII—VII of FIG. 2.
Figure 8:
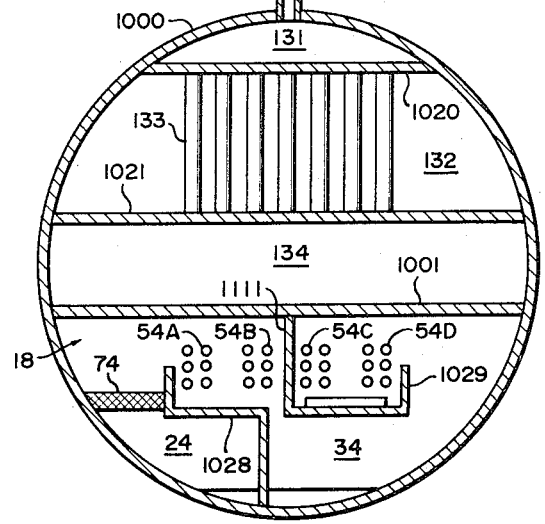
FIG. 8 is a vertical sectional view taken on the line VIII—VIII of FIG. 2.

As shown in FIGS. 2, 3 and 4, the flash chambers and vapor condensing chambers at the flash stages 21, 22 which are relatively high in temperature, are about three times wider than those at the fresh water evaporation stages 31, 32. The flash chambers and vapor condensing chambers at the sea water evaporation stages 23, 24 maintained at an intermediate temperature are substantially the same in volume as those at the sea water evaporation stages 33, 34 as shown in FIGS. 5, 6 and 7. The flash chambers and vapor condensing chambers at the evaporation stages 25, 26 are about one-third in volume of that of the chambers at the relatively low temperature evaporation stages 35, 36 as shown in FIGS. 8 and 9. This is because the flow rate of feed liquor in the high temperature evaporation chambers of the multistage flash preheater is about three times that of the fresh water and the quantity of the fresh water produced from the feed liquor gradually increases toward the lower temperature stages and becomes about three times that of the feed liquor in the low temperature evaporation chambers. For this reason, the number of the condensing heating tubes in the respective chambers is changed in proportion to the flow rate ratio between the feed liquor and fresh water.

The evaporation stages 21 to 26 of the multistage flash evaporation part 2 and the evaporation stages 31 to 36 of the multistage fresh water flash evaporation part 3 respectively are arranged in adjoining relation and are separated from each other by the partition plates 1,022, 1024, 1,026, 1,028, 1,030 as shown in FIGS. 2 to 9. Passages are formed between the sea water evaporation part 2 and fresh water evaporation part 3, through which the fresh water formed in said sea water evaporation part flows down into said fresh water evaporation part.

As shown in FIGS. 2, 5 and 8, passages 515, 518, 521 are arranged in the evaporator unit to allow the brine formed in the vapour-liquor separating chambers 114, 124, 134 of the evaporator effects 11, 12, 13 to flow down into the evaporation stages 21, 23, 25 respectively.

Further, passages 701, 703, 704, 705 are formed in the evaporator unit as shown in FIGS. 10, 3, 6 and 9, through which the vapour drain (fresh water) of the evaporator effects 11, 12, 13 and condenser 4 flows down into the heater 5 and fresh water evaporation stages 31, 33, 35 respectively.

As stated, the stages 21, 23, 25 of the multistage flash evaporation part 2 and the stages 31, 33, 35 of the fresh water evaporation part 3 are arranged respectively below and between the evaporator effects 11 and 12, 12 and 13, and between the evaporator effect 13 and condenser 4.

The numbers of the condensing heating tubes in the corresponding stages 21 and 31, 22 and 32, ..., 26 and 36, of the multistage flash evaporation part 2 and fresh water flash evaporation part 3 are allocated in proportion to the flow rates of sea water and fresh water passing in said respective stages. Namely, the feed liquor is divergingly passed in four condensing heating tube bundles which are arranged such that one tube bundle 55A in the multistage flash evaporation part 2 and three tube bundle 55B, 55C, 55D in the multistage fresh water evaporation part 3 at the stages 26 and 25; two tube bundles 54A, 54B in the multistage flash evaporation part 2 and two tube bundles 54C, 54D in the multistage fresh water flash evaporation part 3 at the stages 24, 34 and 23, 33; three tube bundles 52A, 52B, 52C, 51A, 51B, 51C in the multistage flash evaporation part 2 and one tube bundle 52D, 51D in the multistage fresh water flash evaporation part 3 at the stages 22, 32 and 21, 31.

The evaporator effects 11, 12, 13; the stages 21 to 26 of the multistage flash evaporation part 2; and the stages 31 to 36 of the multistage fresh water flash evaporation part 3 are respectively connected to bleeding means (not shown) so as to provide a pressure gradient.

Feed liquor is pumped from a tube (shown at 501 in FIG. 1) by a sea water pump (shown at 41 in FIG. 1) and led into the condenser 4 through a tube (shown at 502 in FIG. 1). The feed liquor leaving the condenser 4 is mostly discharged at 504 (FIG. 1) but a portion is led into the tube bundles 56A, 56B, 56C through the tube 506, and passes in the tube bundles 56A, 55A, . . . , 51A of the multistage flash evaporation part, during which period the vapour generated from the liquor is condensed and the liquor is preheated. The feed liquor also passes in the tube bundles 56B, 55B, . . . , 51B and in the pipes 56C, 55C, . . . , 51C, 56D, 55D, . . . , 51D, and thence in the pipe 523 in the heater 5. After having been heated during passage in the pipe 423, the feed liquor is introduced into the first stage 21 of the multistage flash evaporation part 2. In the stage 21, the feed liquor is partially flash-evaporated and the remainder thereof forms brine. The brine formed in the stage 21 flows into the stage 22 and flash evaporated therein. The brine passes sequentially in the stages 23, 24, 25, 26 while similarly being flash-evaporated and is withdrawn from a pipe (shown at 511 in FIG. 1) by a brine discharge pump (shown at 42 in FIG. 1) to be discharged.

The brine in the evaporation stage 21 of the multistage flash evaporation part 2 is pumped through the pipe 513 by a brine recycling pump (shown at 45 in FIG. 1) and introduced into the brine chamber 111 of the evaporator unit 11 from the pipe 514. This brine is distributed into the large number of vertical heating tubes 113 by means of a nozzle and heated by the vapour externally of the tubes, whereby it is partially evaporated in said tubes. The mixture of the brine and vapour is discharged from the tube ends in the state of two-phase flow and led into the vapour-liquor separating chamber 114, wherein the vapour and liquor are separated from each other. The brine returns to the stage 21 of the multistage flash evaporation part 2 through the passage 515. Similar recycle of brine occurs in the tubes 516, 517 and the passage 518 between the evaporation effect 12 and the stage 23 of the multistage flash evaporation part 2, and in the tubes 519, 520 and the passage 521 between the evaporator effect 13 and the stage 25 of said evaporation part 2.

The heating vapour is supplied normally from a boiler (shown at 45 in FIG. 1). The major portion of the vapour is introduced into the evaporator effect 11 from the tube 602 (FIGS. 1 and 2) and the remaining portion into the heater 5 from the tube 603 (FIGS. 1 and 11). The vapour drain from the evaporator effect 11 is withdrawn through the tube 701 and the vapour drain from the heater 5 from the tube 702 (FIGS. 1, 2 and 11), and both of them are returned to the boiler via a boiler condensing pump (not shown). The vapour generated in the evaporator effect 11 is led into the next evaporator effect 12 through the tube 604 and the vapour generated in the evaporator effect 12 into the next evaporator effect 13 through the tube 605, to be used for heating therein. The vapour generated in the evapoorator effect 13 is led into the condenser 4 through the tube 606 and condensed to fresh water on the surface of the heating tube 522.

The vapour drain from the evaporator effect 11 is returned to the boiler, but the vapour drain (fresh water) from the evaporator effect 12 is led into the first stage 31 of the multistage fresh water flash evaporation part 3 through the tube 703.

This fresh water is partially flash-evaporated in the stage 31 and introduced into the stage 32 together with the fresh water from the stage 21 of the multistage flash evaporation part 2. The fresh water is again partially flash-evaporated in the stage 32 and then introduced into the stage 33 together with the fresh water from the stage 22 of the multistage flash evaporation part 2. To the stage 33 of the multistage fresh water flash evaporation part 3 is introduced the vapour drain (fresh water) from the evaporator effect 13 through the tube 704. The fresh water thus supplied to the stage 33 of the multistage fresh water flash evaporation part 3 along the two lines is partially flash evaporated therein and led into the stage 34 together with the fresh water from the stage 23 of the multistage flash evaporation part 2. The fresh water is partially flash-evaporated also in the stage 34 and led into the stage 35 together with the fresh water from the stage 24 of the multistage flash evaporation part 2. To the stage 35 is supplied the vapour drain (fresh water) from the condenser 4 through the tube 705. The fresh water thus supplied to the stage 35 along the two bundles is partially flash-evaporated therein and led into the final stage together with the fresh water from the stage 25 of the multistage flash evaporation part 2, in which it is partially flash-evaporated and the remaining fresh water is joined with the fresh water from the stage 26 of the multistage flash evaporation part 2 and withdrawn by a fresh water pump shown at 43 in FIG. 1 as the product fresh water.

The distilled water obtained by the flash-evaporation of the fresh water in the fresh water flash evaporation part 3 is pure water of extremely high purity. The pure water is formed in each of the evaporation stages 31, 32, . . . , and after passing in the stages 31, 32, . . . , successively, is withdrawn by a pure water pump shown at 44 in FIG. 1 as the product pure water.

What is claimed is:

1. A multiple effect — multistage flash evaporator having several evaporator effects arranged serially for treating a feed liquor by passing it sequentially therethrough, wherein hot vapor generated in one of said evaporator multieffects is used for heating the feed liquor passing in the next multieffect evaporator, whereby the feed liquor is partially evaporated and increased in concentricity, while said hot vapor is condensed; said evaporator also comprising a multistage liquor flash evaporator having several evaporation stages for flash evaporating the feed liquor therein, several condensation stages for indirectly condensing the vapor generated in said respective liquor flash evaporation stages to fresh water by heat exchange with said feed liquor therein, said liquor flash evaporation stages and condensation stages being arranged serially in counterflow respectively, said liquor flash stages corresponding with said multieffect evaporator stages with respect to falling temperature and pressure gradient and liquor flow from first to last stage, means for heating the feed liquor emerging from said condensation stages and lines for thence leading the heated liquor to both said multieffect and liquor flash evaporator stages; a multistage fresh water flash evaporator having several fresh water flash evaporation stages, several condensation stages for indirectly condensing the vapor generated in said respective fresh water evaporation stages to pure water by indirect heat exchange with said feed liquor therein, said fresh water flash evaporation stages and condensation stages respectively being arranged serially and in counterflow so that the fresh water flash stages are in a falling temperature and pressure gradient, liquor flow and condensate flow correspondence from the first to the last stage with those of the multieffect evaporator, and means for withdrawing the pure water from said condensation stages independently of the fresh water passing in said condensation stages; lines for leading the concentrated residual feed liquor into the corresponding evaporation stages of the multistage flash evaporator to be partially evaporated therein and supplying the residual feed liquor to the next evaporator effect; and lines for leading the fresh water thus formed into the flash evaporation stages of the multistage fresh water flash evaporator.

2. A multiple effect — multistage flash evaporator according to claim 1, in which the flow rate of the feed liquor passing in the indirect condensation stages of said multistage liquor flash evaporator and said multistage fresh water flash evaporator varies with said stages so that in the multistage liquor flash evaporator the volumetric flow rate becomes progressively higher from the low temperature low pressure stage toward the high temperature high pressure stage, while in the indirect condensation stages of said multistage fresh water flash evaporator the volumetric flow rate of the feed liquor becomes progressively lower from the low pressure low temperature stage toward the high pressure high temperature stage.

3. A multiple effect — multistage flash evaporator comprising a casing; a multieffect evaporator part provided in said casing and having several evaporator effects arranged axially and contiguously of said casing and each including heating means of the vertical tube type, liquor chambers provided in adjoining relation to said evaporator effect heating means, vapor-liquor separating chambers arranged in adjoining relation to said evaporator effect heating means on the opposite side of said liquor chambers, and passages for leading the vapor separated in said vapor-liquor separating chambers into the heating means of the next stage evaporator effect; a multi-stage flash evaporation part provided in said casing and having a heater for the first flash stage and also having several feed heating chambers arranged axially and contiguously of said casing with feed liquor preheating conduits arranged therein, corresponding feed liquor flashing chambers and passages for leading the vapor generated in each said flashing chamber into its corresponding heating chamber for condensation therein, a partition plate provided in said casing extending axially thereof and separating said evaporator effect part and said multistage flash evaporation part from each other; passages for leading the preheated feed liquor from said flash chambers into their corresponding first-mentioned liquor chambers; and passages for leading the brine from said vapor-liquor separating chambers into their corresponding flashing chambers.

4. A multiple effect — multistage flash evaporator according to claim 3, in which the interior of each of said heating chambers is divided by a partition plate into a first sub-chamber in which the vapor generated by the flash evaporation of the feed liquor is to be condensed and a second sub-chamber in which the condensate formed in said first sub-chamber is to be again flash-evaporated and the vapor thus generated is to be condensed.

5. A multiple effect — multistage flash evaporator according to claim 3, in which the interior of each of said heating chambers is divided by a partition plate into a first sub-chamber in which the vapor generated by the flash evaporation of the feed liquor is to be condensed and a second sub-chamber in which the condensate formed in said first sub-chamber is to be again flash-evaporated and the vapor thus generated is to be condensed, and the position of said partition plate is changed in the respective heating chambers such that the volume of the first sub-chamber is larger than that of the second sub-chamber in the heating chambers closer to the feed liquor supply high pressure end and the volume of the first sub-chamber is smaller than that of the second sub-chamber in the heating chambers closer to the low pressure discharge end.

* * * * *